United States Patent

Moser et al.

[11] Patent Number: 5,274,054
[45] Date of Patent: Dec. 28, 1993

[54] ADDUCTS OF EXPOSIDES AND AMINES

[75] Inventors: Roland Moser, Basel; Hans Lehmann, Aesch; Daniel Bär, Riehen, all of Switzerland

[73] Assignee: Ciba-Geigy Corporation, Ardsley, N.Y.

[21] Appl. No.: 861,705

[22] Filed: Apr. 1, 1992

[30] Foreign Application Priority Data

Apr. 4, 1991 [CH] Switzerland .................. 1003/91-3

[51] Int. Cl.⁵ .................................. C08F 283/00
[52] U.S. Cl. .................................. 525/526; 525/504; 528/111; 528/407; 564/487; 564/504; 564/506
[58] Field of Search ............ 528/111, 407; 525/504, 525/526; 564/487, 504, 506

[56] References Cited

U.S. PATENT DOCUMENTS

| | | | |
|---|---|---|---|
| 3,860,541 | 1/1975 | Lehmann et al. ............. | 525/530 |
| 3,963,667 | 6/1976 | Schreiber et al. ............ | 260/37 |
| 3,996,175 | 12/1976 | Schreiber et al. ........... | 260/28 |
| 4,088,633 | 5/1978 | Gurney ........................ | 528/103 |
| 4,101,459 | 7/1978 | Andrews ...................... | 528/107 |
| 4,539,347 | 9/1985 | DeGooyer .................... | 523/404 |
| 5,025,078 | 6/1991 | Lucas et al. ................. | 525/523 |

FOREIGN PATENT DOCUMENTS 0044816 1/1982 European Pat. Off. .
2143366 2/1973 France .

*Primary Examiner*—Melvyn I. Marquis
*Assistant Examiner*—Randy Gulakowski
*Attorney, Agent, or Firm*—William A. Teoli, Jr.

[57] ABSTRACT

Adducts which are obtainable by reacting cycloaliphatic or heterocycloaliphatic polyamines containing at least two primary groups with polyfunctional epoxides containing more than two epoxy groups per molecule in such amounts as to supply 10–100 equivalents of active hydrogen atoms bound to amino nitrogen per one epoxide equivalent, are suitable hardeners for epoxy adhesives, especially adhesives for metals and thermosetting plastics.

10 Claims, No Drawings

ADDUCTS OF EXPOSIDES AND AMINES

The present invention relates to adducts obtainable by reacting cycloaliphatic or heterocycloaliphatic polyamines with polyfunctional epoxides, and to the use thereof as hardeners for epoxy resins.

It is well known that epoxy resins which are cured with aromatic amines have superior dimensional stability under heat. Adducts of aromatic polyamines and low molecular epoxides as hardeners for epoxy resins are disclosed in U.S. Pat. No. 3,996,175. The epoxy resin moulding compounds so obtained have good shelf-lives and high curing rates.

Amino group containing adducts of cycloaliphatic, aromatic or heterocyclic polyamines and polyglycidyl compounds, preferably diglycidyl compounds are disclosed in U.S. Pat. No. 3,963,667 as hardeners for advanced triglycidylbishydantoins or triglycidyl bisdihydrouracils.

The utility as hardeners for adhesives, however, requires a low viscosity, which the known adduct hardeners do not always have. In addition, for ecological and toxicological reasons there is a need to replace the aromatic amines by less toxic compounds.

It has now been found that adducts of less toxic cycloaliphatic or heterocycloaliphatic amines and polyepoxide compounds have a low viscosity and a pale colour, and that the epoxy resins cured therewith have superior dimensional stability under heat and resistance to chemicals.

Specifically, the invention relates to adducts which are obtainable by reacting cycloaliphatic or heterocycloaliphatic polyamines containing at least two primary groups with polyfunctional epoxides containing more than two epoxy groups per molecule in such amounts as to supply 10–100 equivalents of active hydrogen atoms bound to amino nitrogen per one epoxide equivalent.

For the preparation of the novel adducts, it is preferred to use polyamine and polyfunctional epoxide in amounts such as to supply 10–50 equivalents, preferably 20–30 equivalents, of active hydrogen atoms bound to amino nitrogen per one epoxide equivalent.

The polyamine component of the novel adducts may in principle be any cycloaliphatic or heterocycloaliphatic amine containing at least two primary amino groups.

Representative examples of cycloaliphatic amines are:

1,2- and 1,4-diaminocyclohexane, bis(4-aminocyclohexyl)methane, bis(4-amino-3-methylcyclohexyl)methane, 2,2-bis(4-aminocyclohexyl)propane, 3-aminomethyl-3,5,5-trimethylcyclohexylamine (isophoronediamine), bis(4-amino-3,5-dimethylcyclohexyl)methane and 1,3-bis(aminomethyl)cyclohexane.

Representative examples of heterocycloaliphatic polyamines are:

4-amino-3-aminomethyl-1-cyclohexylpiperidine, 4-amino-3-aminomethyl-1-benzylpiperidine, 2-[4-(1,7-diaminoheptyl)]-5,5-dimethyl-1,3-dioxane, 4-amino-3-aminomethyl-1-(3-dimethylaminopropyl)piperidine, 3-amino-4-aminomethyl-1-(3-dimethylaminopropyl)-2-methylpyrrolidine, 3-amino-4-aminomethyl-1,2,2-trimethylpyrrolidine, 3-amino-4-aminomethyl-1-cyclohexyl-2,2-dimethylpyrrolidine, and 3-amino-4-aminomethyl-2-phenyl-1,2-dimethylpyrrolidine.

The polyamine will preferably be a diamine of formula (I), (II) or (III)

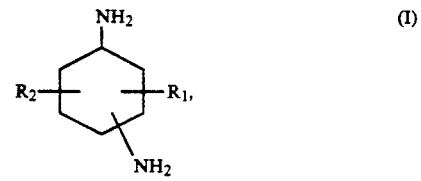

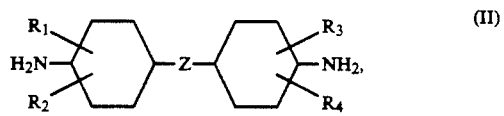

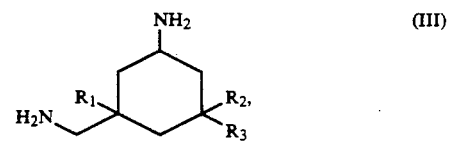

wherein the substituents $R_1$ to $R_4$ are each independently of one another hydrogen or $C_1$–$C_4$alkyl, and Z is a direct bond, $-CH_2-$, $-C(CH_3)_2-$, $-S-$, $-O-$, $-SO_2-$ or $-CO-$.

Particularly preferred adducts are those claimed in claim 1, wherein the cycloaliphatic polyamine is selected from the group consisting of 1,2-diaminocyclohexane, 1,4-diaminocyclohexane, bis(4-aminocyclohexyl)methane, bis(4-amino-3-methylcyclohexyl)methane and 3-aminomethyl-3,5,5-trimethylcyclohexylamine.

In especially preferred adducts the cycloaliphatic polyamine is bis(4-aminocyclohexyl)methane or bis(4-amino-3-methylcyclohexyl)methane.

The polyfunctional epoxide for the preparation of the novel adducts may in principle be any compound customarily used in the art of epoxy resins which contains more than two epoxy groups per molecule.

Exemplary of such polyfunctional epoxides are polyglycidyl derivatives of polyhydric alcohols such as hexane-2,4,6-triole, glycerol, 1,1,1-trimethylolpropane, pentaerythritol or sorbitol, and also polyglycidyl derivatives of polynuclear phenols, typically 1,1,2,2-tetrakis(4-hydroxyphenyl)ethane, as well as of novolaks obtainable by condensation of aldehydes, such as formaldehyde, acetaldehyde, chloral or furfuraldehyde, with phenols, or poly(N-glycidyl) compounds such as triglycidylisocyanurate or the tetraglycide of 4,4'-diaminodiphenylmethane. Further suitable polyfunctional epoxides are triglycides of aminophenols and glycidyl esters of polycarboxylic acids, for example trimellitic acid or pyromellitic acid.

The polyfunctional epoxide is preferably selected from the group consisting of epoxy cresol novolak, epoxy phenol novolak, the tetraglycide of 4,4'-diaminodiphenylmethane, the triglycide of 4-aminophenol and triglycidyl isocyanurate.

The tetraglycide of 4,4'-diaminodiphenylmethane is especially preferred.

Particularly preferred adducts are those of bis(4-amino-3-methylcyclohexyl)methane and the tetraglycide of 4,4'-diaminodiphenylmethane.

The novel adducts are prepared in a manner which is known per se, conveniently by the process described in U.S. Pat. No. 3,996,175. The reaction is conveniently carried out in the absence of solvents in the temperature range from 50° to 200° C., preferably from 80° to 120° C. The novel adducts need not be isolated as individual compounds, but are advantageously used as reaction mixture.

To achieve a good cure at low temperature (20°–40° C.), the novel adducts may be used in conjunction with curing accelerators based on aliphatic amines and/or phenols.

The epoxy resins cured with the novel adducts have surprisingly high glass transition temperatures and superior resistance to boiling water.

The invention thus also relates to curable compositions comprising an epoxy resin and an adduct of a cycloaliphatic or heterocycloaliphatic amine and a polyfunctional epoxide, as well as cured products obtainable by curing such a composition.

Depending on the end use, the novel curable compositions can be blended with the customary modifiers, typically fillers, pigments, dyes, flow control agents or plasticisers.

The novel compositions can be used quite generally as casting resins for the preparation of cured products and can be used in a formulation adapted to each specific end use, typically as adhesives, as matrix resins, as moulding resins or as coating compositions.

Owing to their low vicosity, the novel adducts are especially suitable for use as hardeners for epoxy adhesives, more particularly for metals and thermosetting adhesives.

The novel adducts are particularly suitable for adhesive applications in which only cold curing or curing at low temperature (external application) is possible, but superior temperature resistance allied to superior resistance to chemicals is required, as for bonding piping for transporting hot fluids. The cure can in this case be effected using a heating collar or in situ, i.e. when hot fluids are to be transported.

EXAMPLES A-H:

The novel adducts are prepared as follows:

The hot polyepoxide of 50° C. is added dropwise over half an hour, in an inert gas atmosphere, to the amine which has been heated to 105° C. The reaction mixture is then stirred for another hour at 100° C. The adduct so obtained can then be used as hardener without further working up. The amounts of the components used and the properties of the adducts A-H obtained are given in Table 1.

TABLE 1

| Example | Adduct Synthesis | Equivalent-ratio of amine:epoxide | Appearance | Colour value (Gardner) | Viscosity (Hoeppler falling ball test [Pa · s] |
|---|---|---|---|---|---|
| A | 91.6 parts by weight of 3,3'-dimethyl-4,4'-diamino-dicyclohexylmethane 11.3 parts by weight of epoxy phenol novolak (epoxy value: 5.6 eq/kg) | 24:1 | very pale yellow | 1 | 4.3 (25° C.) |
| B | 91.9 parts by weight of 4,4'-diaminodicyclohexyl-methane 8.1 parts by weight of the tetraglycide of 4,4'-diamino-diphenylmethane (epoxy value: 9.0 eq/kg) | 24:1 | dark yellow | 3–4 | 2.5 (25° C.) |
| C | 92.8 parts by weight of 3,3'-dimethyl-4,4'-diamino-dicyclohexylmethane 7.2 parts by weight of the tetraglycide of 4,4'-diamino-diphenylmethane (epoxy value: 9.0 eq/kg) | 24:1 | pale yellow | 1–2 | 1.2 (25° C.) |
| D | 86.4 parts by weight of 3,3'-dimethyl-4,4'-diamino-dicyclohexylmethane 13.6 parts by weight of the tetraglycide of 4,4'-diamino-diphenylmethane (epoxy value: 9.0 eq/kg) | 24:2 | pale yellow | 1–2 | 8.4 (50° C.) |
| E | 90.2 parts by weight of isophoronediamine 9.8 parts by weight of the tetraglycide of 4,4'-diamino-diphenylmethane (epoxy value: 9.0 eq/kg) | 24:1 | yellow | 1–2 | 0.4 (25° C.) |
| F | 92.8 parts by weight of 3,3'-dimethyl-4,4'-diamino-dicyclohexylmethane 7.2 parts by weight of the triglycidyl isocyanurate | 24:1 | colourless | 0–1 | 6.3 (25° C.) |
| G | 96.4 parts by weight of 3,3'-dimethyl-4,4'-diamino-dicyclohexylmethane 3.6 parts by weight of the tetraglycide of 4,4'-diamino-diphenylmethane (epoxy value: 9.0 eq/kg) | 50:1 | pale yellow | 1 | 0.4 (25° C.) |
| H | 95.0 parts by weight of isophoronediamine | 50:1 | pale yellow | 1 | 0.04 (25° C.) |

TABLE 1-continued

| Example | Adduct Synthesis | Equivalent-ratio of amine:epoxide | Appearance | Colour value (Gardner) | Viscosity (Hoeppler falling ball test [Pa · s] |
|---|---|---|---|---|---|
| | 5.0 parts by weight of the tetraglycide of 4,4'-diaminodiphenylmethane (epoxy value: 9.0 eq/kg) | | | | |

Use Examples 1-6

100 g of an epoxy resin formulation comprising 30 g of bisphenol A/bisphenol F co-glycide (epoxy value: 5.6 eq/kg) and 70 g of epoxy phenol novolak (epoxy value: 5.65 eq/kg) are mixed with an adduct hardener of any one of Examples A-F and 8.3 g of a curing accelerator consisting of 75 parts by weight of pentaethylenehexamine and 25 parts by weight of bisphenol A, and cured for 24 h at room temperature and subsequently for 1 h at 150° C. The glass transition temperatures (measured with a Mettler TA 3000 thermoanalyser) and shear strength values (DIN 53 283) of the cured mouldings are reported in Table 2.

TABLE 2

| Example | 1 | 2 | 3 | 4 | 5 | 6 |
|---|---|---|---|---|---|---|
| hardener A | 24.3 g | | | | | |
| hardener B | | 23.0 g | | | | |
| hardener C | | | 23.5 g | | | |
| hardener D | | | | 26.2 g | | |
| hardener E | | | | | 18.4 g | |
| hardener F | | | | | | 23.5 g |
| shear strength (lap) N/mm² | 11.3 | 11.3 | 11.5 | 12.1 | 10.0 | 9.6 |
| glass transition temp. (°C.) | 158 | 163 | 161 | 156 | 164 | 163 |

What is claimed is:

1. An adduct which is obtained by reacting a cycloaliphatic or heterocycloaliphatic polyamine containing at least two primary groups with a polyfunctional epoxide containing more than two epoxy groups per molecule in such amounts as to supply 20-30 equivalents of active hydrogen atoms bound to amino nitrogen per one epoxide equivalent.

2. An adduct according to claim 1, wherein the cycloaliphatic polyamine is a diamine of formula (I), (II) or (III)

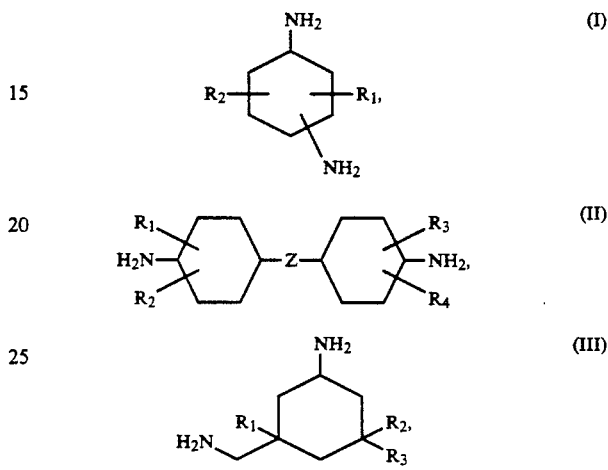

wherein the substituents $R_1$ to $R_4$ are each independently of one another hydrogen or $C_1$-$C_4$alkyl, and Z is a direct bond, —$CH_2$—, —$C(CH_3)_2$—, —S—, —O—, —$SO_2$— or —CO—.

3. An adduct according to claim 1, wherein the cycloaliphatic polyamine is selected from the group consisting of 1,2-diaminocyclohexane, 1,4-diaminocyclohexane, bis(4-aminocyclohexyl)methane, bis(4-amino-3-methylcyclohexyl)methane and 3-aminomethyl—3,5,5-trimethylcyclohexylamine.

4. An adduct according to claim 1, wherein the cycloaliphatic polyamine is bis(4-aminocyclohexyl)methane or bis(4-amino-3-methylcyclohexyl)methane.

5. An adduct according to claim 1, wherein the polyfunctional epoxide is selected from the group consisting of epoxy cresol novolak, epoxy phenol novolak, the tetraglycide of 4,4'-diaminodiphenylmethane, the triglycide of 4-aminophenol and triglycidyl isocyanurate.

6. An adduct according to claim 1, wherein the polyfunctional epoxide is the tetraglycide of 4,4'-diaminodiphenylmethane.

7. An adduct according to claim 1 of bis(4-amino-3-methylcyclohexyl)methane and the tetraglycide of 4,4'-diaminodiphenylmethane.

8. A curable composition comprising an epoxy resin and an adduct as claimed in claim 1.

9. A cured product obtainable by curing a composition as claimed in claim 7.

10. Use of an adduct as claimed in claim 1 as hardener for adhesive compositions.

* * * * *